(12) United States Patent
Arends et al.

(10) Patent No.: US 11,943,836 B1
(45) Date of Patent: Mar. 26, 2024

(54) SERVICE-BASED ARCHITECTURE FOR INTERNET PROTOCOL MULTIMEDIA SUBSYSTEM

(71) Applicant: T-Mobile USA, Inc., Bellevue, WA (US)

(72) Inventors: Joel Arends, Renton, WA (US); Nassereddine Sabeur, Bellevue, WA (US); Raymond Ball, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 398 days.

(21) Appl. No.: 17/313,912

(22) Filed: May 6, 2021

(51) Int. Cl.
| | |
|---|---|
| *H04W 8/12* | (2009.01) |
| *H04W 8/20* | (2009.01) |
| *H04W 84/04* | (2009.01) |

(52) U.S. Cl.
CPC ............... *H04W 8/12* (2013.01); *H04W 8/20* (2013.01); *H04W 84/042* (2013.01)

(58) Field of Classification Search
CPC . H04L 43/00; H04L 65/1016; H04L 41/0654; H04W 72/23; H04W 72/542; H04W 72/046
USPC ................................ 370/328, 329, 330, 331
See application file for complete search history.

(56) References Cited

U.S. PATENT DOCUMENTS

| | | | |
|---|---|---|---|
| 6,769,000 B1 | 7/2004 | Akhtar et al. | |
| 6,788,676 B2 | 9/2004 | Partanen et al. | |
| 6,847,975 B2 | 1/2005 | Nishikado et al. | |
| 6,910,074 B1 | 6/2005 | Amin et al. | |
| 6,970,452 B2 | 11/2005 | Kim et al. | |
| 7,058,033 B1 | 6/2006 | Dantu et al. | |
| 7,068,644 B1 | 6/2006 | Mcconnell et al. | |
| 7,164,913 B1 | 1/2007 | Dantu et al. | |
| 7,277,702 B2 | 10/2007 | Ropolyi et al. | |
| 7,305,240 B2 | 12/2007 | Chou et al. | |
| 7,330,453 B1 | 2/2008 | Borella et al. | |
| 7,391,724 B2 | 6/2008 | Alakoski et al. | |
| 7,444,151 B2 | 10/2008 | Dantu et al. | |
| 7,450,931 B2 | 11/2008 | Alston | |
| 7,457,265 B2 | 11/2008 | Julka et al. | |

(Continued)

FOREIGN PATENT DOCUMENTS

| | | |
|---|---|---|
| CN | 1225922 C | 11/2005 |
| CN | 100407622 C | 7/2008 |

(Continued)

*Primary Examiner* — David Q Nguyen
(74) *Attorney, Agent, or Firm* — Perkins Coie LLP

(57) ABSTRACT

Methods, devices, and system related to providing service-based interfaces between network functions and a proxy call session control function for Internet Protocol (IP) Multimedia Subsystem services. In one example aspect, a method for wireless communication includes retrieving, by a proxy call session control function, an address of an access and mobility management function from a unified data management function. The proxy call session control function is configured to communicate with the unified data management function directly via a first service-based interface. The method also includes retrieving, by the proxy call session control function, information from the access and mobility management function. The proxy call session control function is configured to communicate with the access and mobility management function directly via a second service-based interface.

20 Claims, 10 Drawing Sheets

(56) References Cited

U.S. PATENT DOCUMENTS

| | | | |
|---|---|---|---|
| 7,483,989 B2 | 1/2009 | Williams et al. | |
| 7,561,579 B2 | 7/2009 | Madour et al. | |
| 8,144,591 B2 * | 3/2012 | Ghai | H04L 47/824 |
| | | | 455/448 |
| 2008/0250156 A1 * | 10/2008 | Agarwal | H04L 47/32 |
| | | | 709/235 |

FOREIGN PATENT DOCUMENTS

| | | | | |
|---|---|---|---|---|
| CN | 100440828 C | | 12/2008 | |
| CN | 100450207 C | | 1/2009 | |
| CN | 100521812 C | | 7/2009 | |
| CN | 103023860 A | * | 4/2013 | |
| DE | 10154546 B4 | | 6/2005 | |
| DE | 10393399 B4 | | 10/2008 | |
| EP | 1480408 B1 | | 7/2006 | |
| EP | 2619964 B1 | * | 2/2018 | H04L 65/1016 |
| JP | 2005039733 A | | 2/2005 | |
| JP | 2008146628 A | | 6/2008 | |
| KR | 100683502 B1 | | 2/2007 | |
| KR | 100756855 B1 | | 9/2007 | |
| KR | 100756977 B1 | | 9/2007 | |
| KR | 100766253 B1 | | 10/2007 | |
| KR | 100768821 B1 | | 10/2007 | |
| KR | 100775540 B1 | | 11/2007 | |
| KR | 20120002249 A | * | 1/2012 | |
| WO | WO-2020251293 A1 | * | 12/2020 | H04L 65/1016 |
| WO | WO-2021145814 A1 | * | 7/2021 | H04L 65/1073 |

* cited by examiner

SERVICE-BASED ARCHITECTURE FOR INTERNET PROTOCOL MULTIMEDIA SUBSYSTEM

BACKGROUND

In telecommunications, packet switching is a method of grouping data that is transmitted over a digital network into packets. In addition to the Packet-Switched (PS) domain, the Third-Generation Partnership Project (3GPP) architecture has introduced a subsystem known as the Internet Protocol (IP) Multimedia Subsystem (IMS).

BRIEF DESCRIPTION OF THE DRAWINGS

Detailed descriptions of implementations of the present invention will be described and explained through the use of the accompanying drawings.

Figure 1:
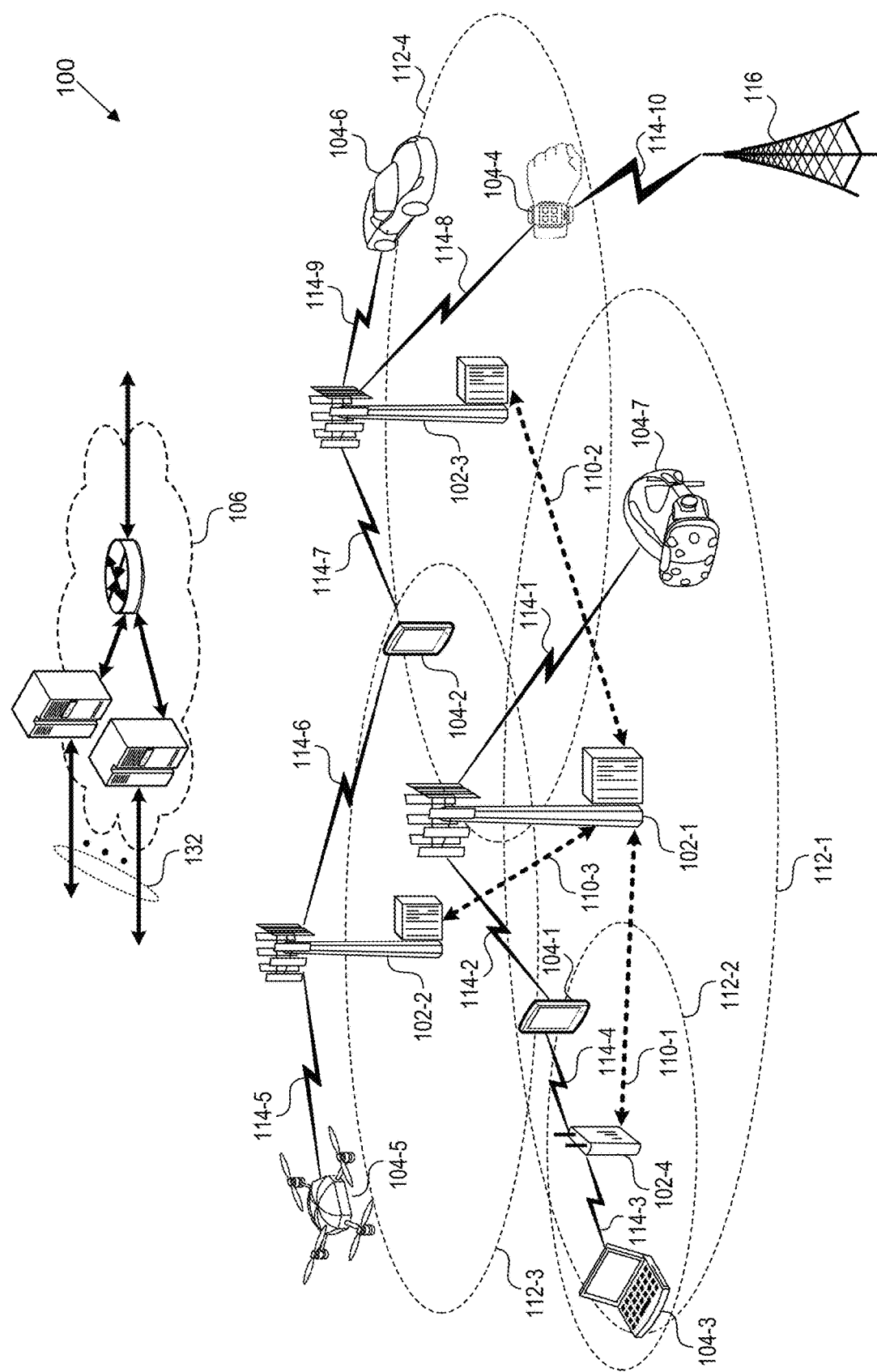
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

With the advance of wireless communication technologies, the 5G system architecture now adopts service-based interactions between Control Plane (CP) Network Functions. In 5G systems, the User Plane (UP) functions are separated from the CP functions, allowing independent scalability, evolution and flexible deployments. However, communication interfaces with the IMS remain largely unchanged, leading to complexity and overhead in signaling paths. This patent document discloses techniques that can be implemented to leverage the service-based framework in 5G for IMS services to reduce or minimize signaling overhead and transmission delays, providing better flexibility and reliability for voice and communication services over 5G networks.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a Long-Term Evolution (LTE)/LTE Advanced (LTE-A) communication channel, which is referred to as a 4G communication channel. In some implementations, the base station 102 can provide network access to a Fifth-Generation (5G) communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-toeverything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

Service-Based Architecture (SBA) for Internet Protocol Multimedia Subsystem (IMS)

Figure 2:
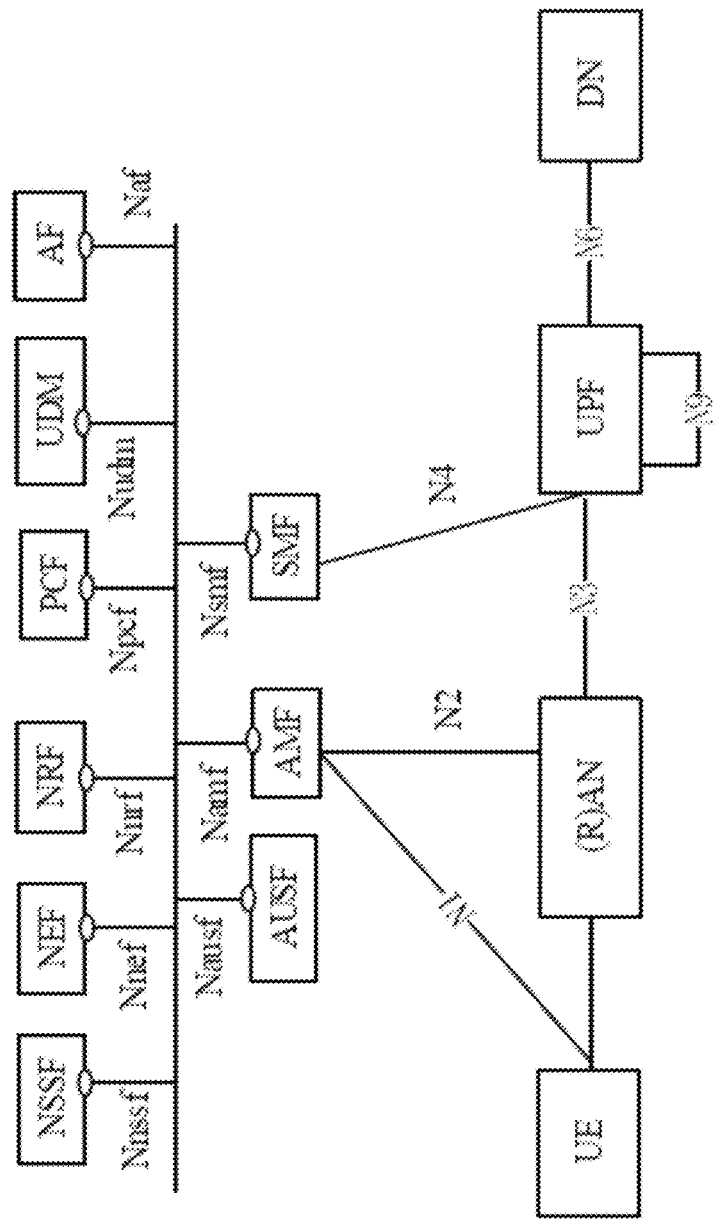
FIG. 2 illustrates an example 5G architecture.

The 5G system architecture includes various service-based interfaces, including but not limited to Namf, the service-based interfaced exhibited by Access and Mobility Management Function (AMF), Nsmf, the service-based interfaced exhibited by Session Management Function (SMF), and Npcf, the service-based interfaced exhibited by Policy Control Function (PCF). FIG. 2 illustrates an example 5G architecture 200. To enable IMS services, the 5G system architecture also supports Rx interface between the PCF and the Proxy-Call Session Control Function (P-CSCF), which is the first contact point for the User Equipment (UE) that uses IMS services. Using the architecture as shown in FIG. 2, a network function (NF) service request from a UE, such as a request for AMF service, needs to travel from the P-CSCF to the PCF via the Rx interface, then to the network function (e.g., the AMF) before the Unified Data Management (UDM) function, which stores the UE's serving NF information, gets notified that the NF information needs to be updated. The long signaling path can result in signaling overhead and transmission delays.

Figure 3:
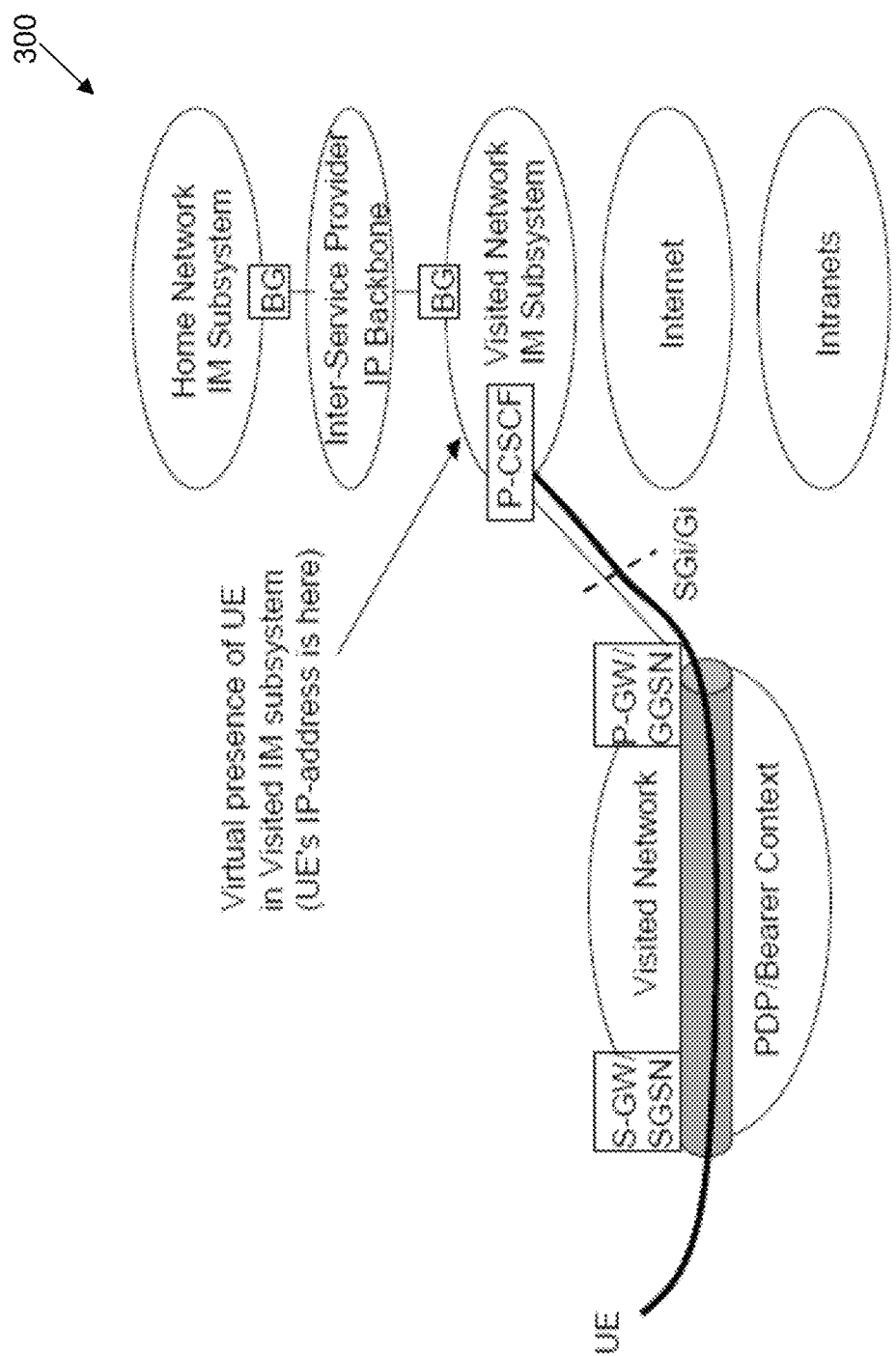
FIG. 3 illustrates a model in which a User Equipment (UE) obtains IP connectivity from the Visited Public Land Mobile Network (V-PLMN).
Figure 4A:
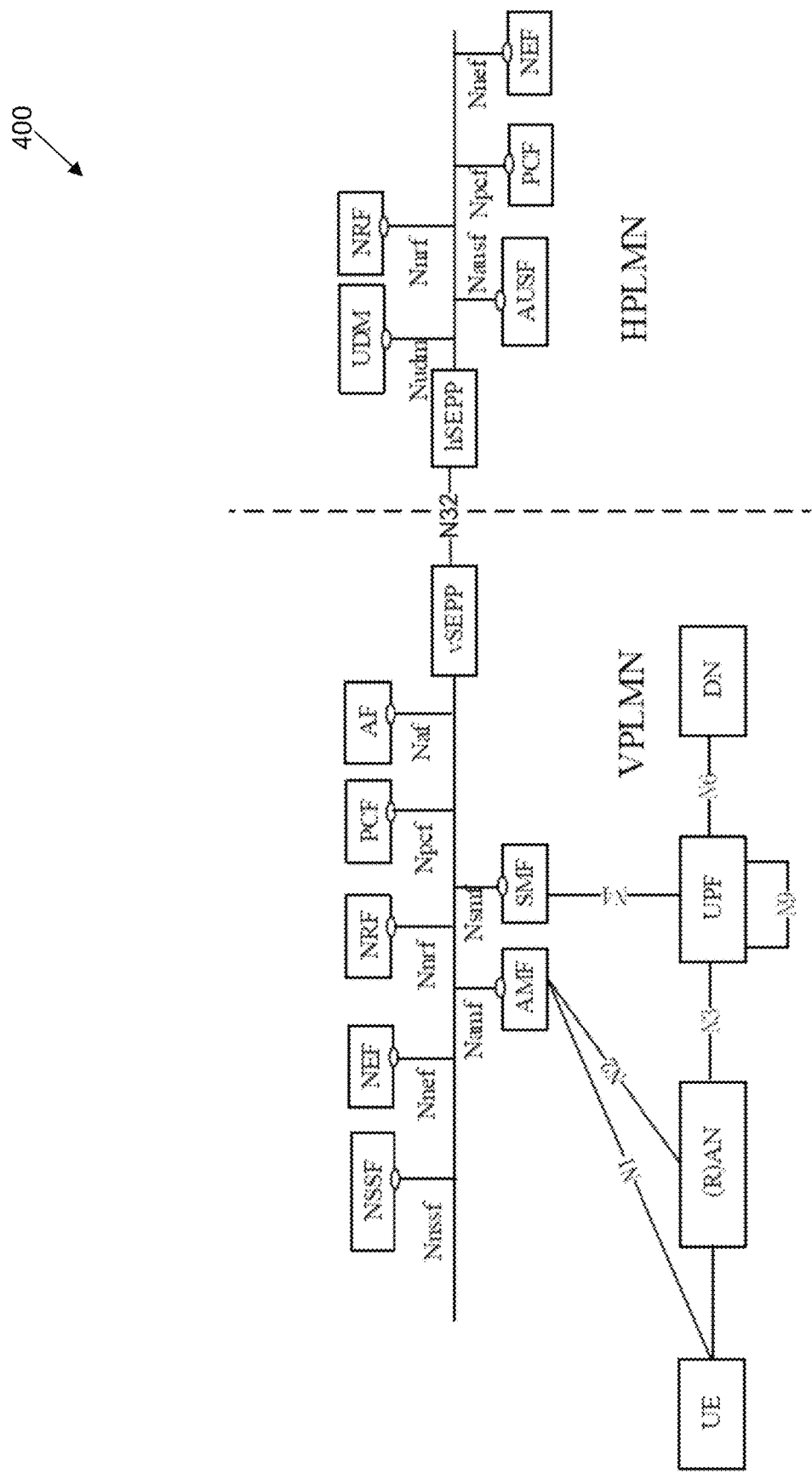
FIG. 4A illustrates an example Fifth-Generation (5G) system roaming architecture using local breakout.
Figure 4B:
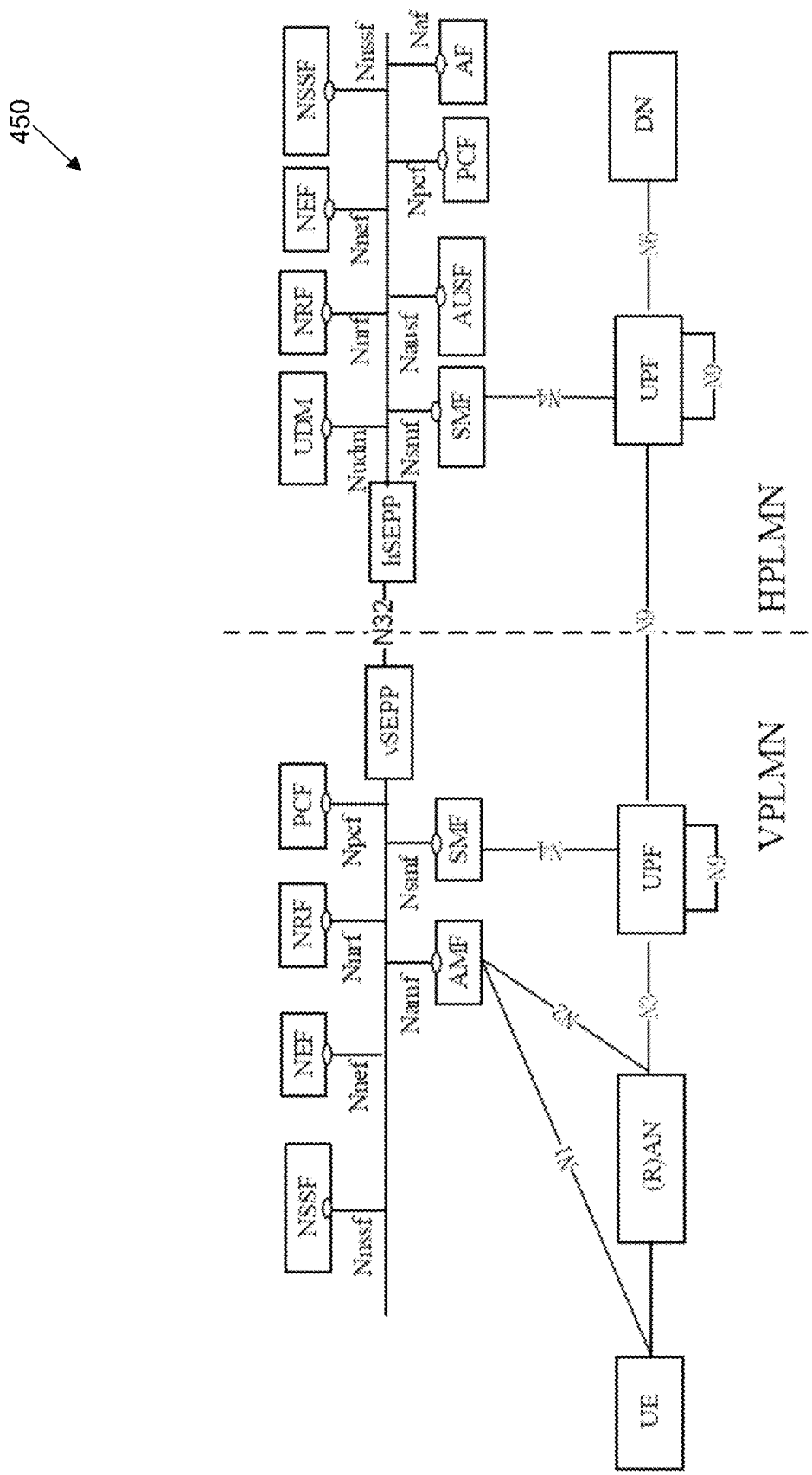
FIG. 4B illustrates an example 5G system roaming architecture in the case of home routed scenario.

The overhead and delay can be further exacerbated when the UE is roaming. A subscribed UE uses the operators Public Land Mobile Network (PLMN) to gain access to the network. When the UE moves outside of the home network, the UE becomes a roaming user and needs to use the resources from other operators' networks, also referred to as visited PLMN(s). The roaming capability makes it possible to use IMS services in the Visited PLMN (V-PLMN). FIG. 3 illustrates a model 300 in which the UE obtains IP connectivity from the V-PLMN. In this model, the P-CSCF in the VPMN is used to connect the UE to the H-PLMN IMS. FIG. 4A illustrates an example 5G system roaming architecture 400 using local breakout, enabling the user to attach to the V-PLMN network and be anchored by the local gateway in the visited network. FIG. 4B illustrates an example 5G system roaming architecture 450 in the case of home routed scenario. In both scenarios, the PCF, as well as the serving AMF and the serving SMF, are located in the V-PLMN while the UDM is located in the H-PLMN. Any service request from the UE needs to travel through different interfaces, resulting in potentially significant overhead and delay.

The service-based architecture of 5G systems enables each NF to interact with other NFs directly if needed. This patent document discloses techniques that can be implemented in various embodiments to enable direct signaling between the P-CSCF and other NFs for IMS services using the unified service-based interface, thereby reducing or minimizing signaling overhead caused by indirect communications via different interfaces.

Instead of limiting the interface between P-CSCF and PCF to be the Rx interface, service-based interfaces can be adopted between P-CSCF and other NFs, such as UDM, AMF, or Network Repository Function (NRF). For control plane signaling between the terminal and the IMS as well as between the components within the IMS, 3GPP has chosen the Session Initiation Protocol (SIP). The SIP can also be used in service-based control plane signaling between the IMS and the network functions.

Figure 5:
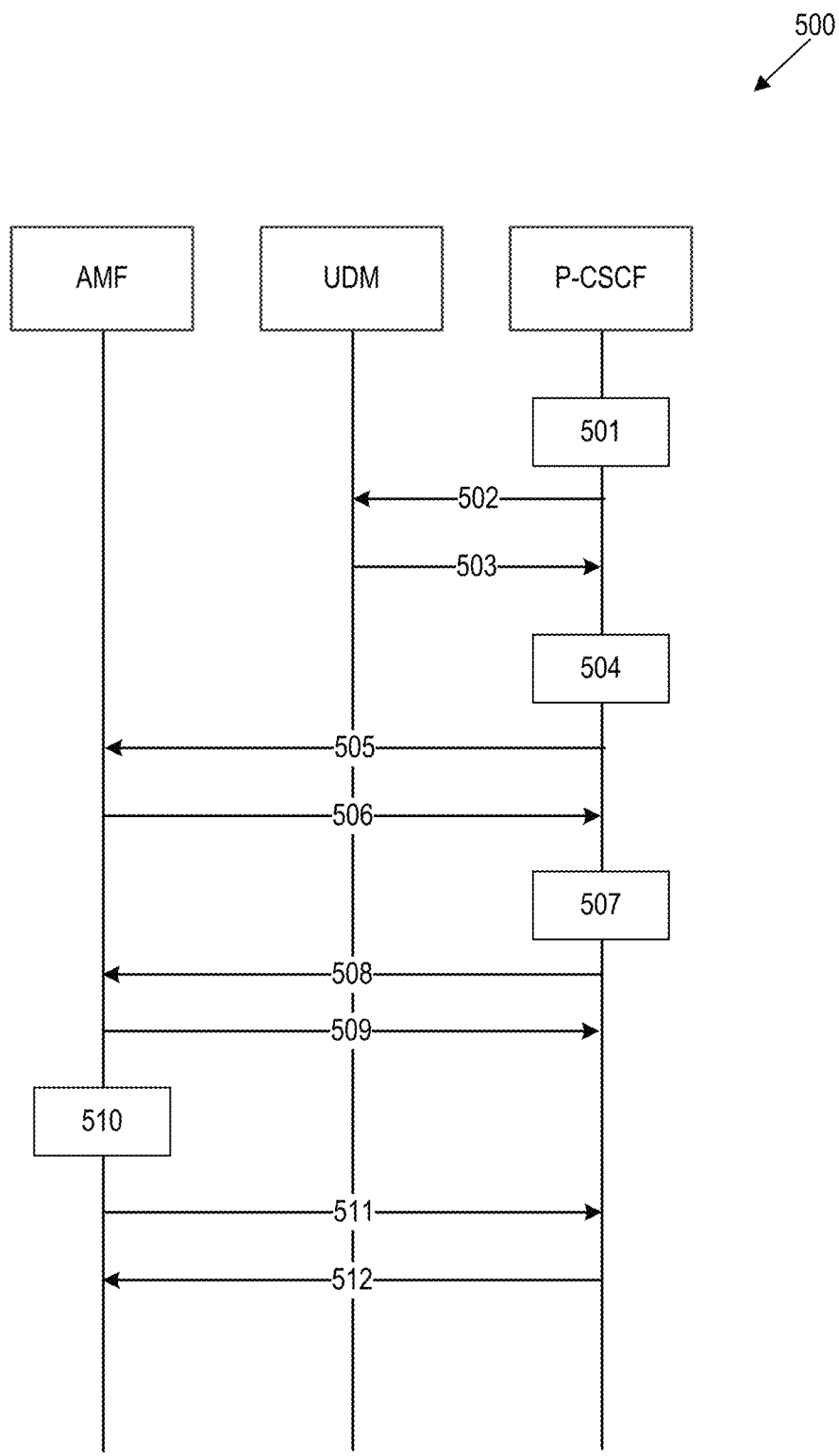
FIG. 5 illustrates an example sequence signaling between the Proxy-Call Session Control Function (P-CSCF) and network functions in accordance with one or more embodiments of the present technology.

FIG. 5 illustrates an example sequence signaling 500 between the P-CSCF and network functions in accordance with one or more embodiments of the present technology. Upon the UE sending a registration request, the UDM can be queried to retrieve UE subscription information. A service-based interface exists between the P-CSCF and the UDM (e.g., Npcscf or Nudm) to enable direct communications between the P-CSCF and the UDM. For example, at operation 501, P-CSCF determines to obtain the IP address or the Fully-Qualified Domain Name (FQDN) of AMF from UDM, where the AMF is selected according to the AMF selection criteria specified in the 3GPP standard. Using the service-based interface, the P-CSCF transmits, at operation 502, a GET request to UDM to request AMF information. The UDM responds directly, at operation 503, with a response returning the IP address or the FQDN of the AMF.

After getting the IP or the FQDN of the AMF, the P-CSCF can determine, at operation 504, to query the AMF for specific events. Examples of events include, but are not limited to, location changes associated with a UE, time-zone changes associated with a UE, access type changes, registration state changes, connectivity state changes, reachability status, and/or additional events defined in the 3GPP standard (e.g., TS 23.502). Another service-based interface exists between the P-CSCF and the AMF (e.g., Npcscf or Namf) such that direct communication between the P-CSCF and the AMF is enabled. The P-CSCF transmits, at operation 505, a POST request to the AMF requesting event information associated with the UE. An example request is shown in Table 1 below.

TABLE 1

| Example Request to AMF | | | |
|---|---|---|---|
| Data Type | P | Cardinality | Description |
| RequestUE-Location | M | 1 | The information to request the location of the UE. |

The AMF returns, at operation 506, the requested event information to the P-CSCF in a response. An example response is shown in Table 2 below.

TABLE 2

| Example Response from AMF | | | | |
|---|---|---|---|---|
| Data Type | P | Cardinality | Response Codes | Description |
| ProvideUE-Location | M | 1 | 200 OK | This case represents a successful query of the UE location. The AMF returns the related information in the response. |

The P-CSCF can cache the received information locally at operation 507. The P-CSCF can then subscribe to one or more specific events. At operation 508, the P-CSCF transmits a SUBSCRIBE request to the AMF and receives a response from the AMF at operation 509. Upon detecting that at least one of the subscribed events has been triggered, the AMF notifies the P-CSCF at operation 510. The AMF transmits, at operation 511, a notification message to the P-CSCF indicating that at least one event has occurred (e.g., the UE has changed location and/or time-zone). The P-CSCF can transmit, at operation 512, an acknowledgement to AMF to indicate that the notification has been received.

Figure 6:
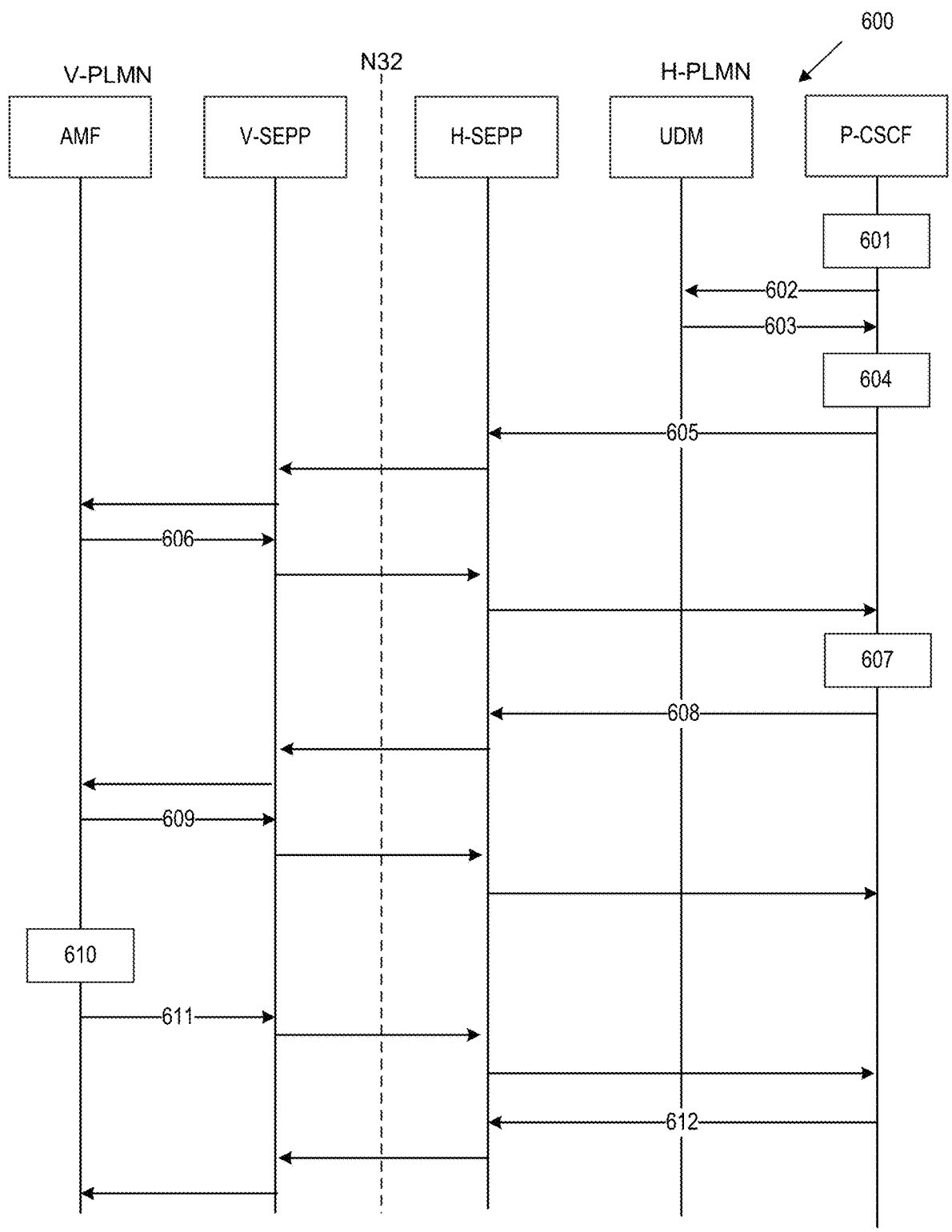
FIG. 6 illustrates an example sequence signaling between the P-CSCF and network functions across different Public Land Mobile Networks (PLMNs) in accordance with one or more embodiments of the present technology.

FIG. 6 illustrates an example sequence signaling 600 between the P-CSCF and network functions across different PLMNs in accordance with one or more embodiments of the present technology. In this example, a roaming UE accesses IMF service via the P-CSCF in the H-PLMN. The P-CSCF determines to obtain the IP address or the Fully-Qualified Domain Name (FQDN) of AMF from UDM at operation 601. Using the service-based architecture, which enables the P-CSCF to communicate with the UDM in the H-PLMN directly, the P-CSCF transmits a request to UDM at operation 602. The UDM responds, at operation 503, with a response returning the IP address or the FQDN of the serving AMF in the V-PLMN determined according to the AMF selection criteria specified in the 3GPP standard.

Upon obtaining the IP address or the FQDN of the AMF, the P-CSCF can communicate with the AMF via the service-based interface (e.g., Npcscf or Namf) and the N32 interface between the Security Edge Protection Proxies, Home SEPP and Visited SEPP. The P-CSCF can determine, at operation 604, to query the AMF for specific events associated with the UE. Examples of events include, but are not limited to, location changes associated with a UE, time-zone changes associated with a UE, access type changes, registration state changes, connectivity state changes, reachability status, and/ or additional events defined in the 3GPP standard (e.g., TS 23.502). The P-CSCF transmits, at operation 605, a POST request to the AMF via the SBA interface and the N32 interface via H-SEPP and V-SEPP. The AMF returns, at operation 606, the requested event information to the P-CSCF via the SBA interface and the N32 interface via H-SEPP and V-SEPP. The P-CSCF can cache or store the received information locally at operation 607. For example, location reports or time-zone reports can be stored locally. The P-CSCF can also subscribe to a specific event. At operation 608, the P-CSCF transmits a SUBSCRIBE request to the AMF via the SBA interface and the N32 interface via H-SEPP and V-SEPP. The P-CSCF receives a response from the AMF at operation 609 via the SBA interface and the N32 interface via H-SEPP and V-SEPP. Upon detecting that the subscribed event has been triggered, the AMF determines to send a notification to the P-CSCF at operation 610. The AMF transmits, at operation 611, a notification message to the P-CSCF indicating that the event has occurred (e.g., the UE has changed location and/or time-zone) via the SBA interface and the N32 interface via H-SEPP and V-SEPP. The P-CSCF can transmit, at operation 612, an acknowledgement to AMF to indicate that the notification has been received via the SBA interface and the N32 interface via H-SEPP and V-SEPP.

Figure 7:
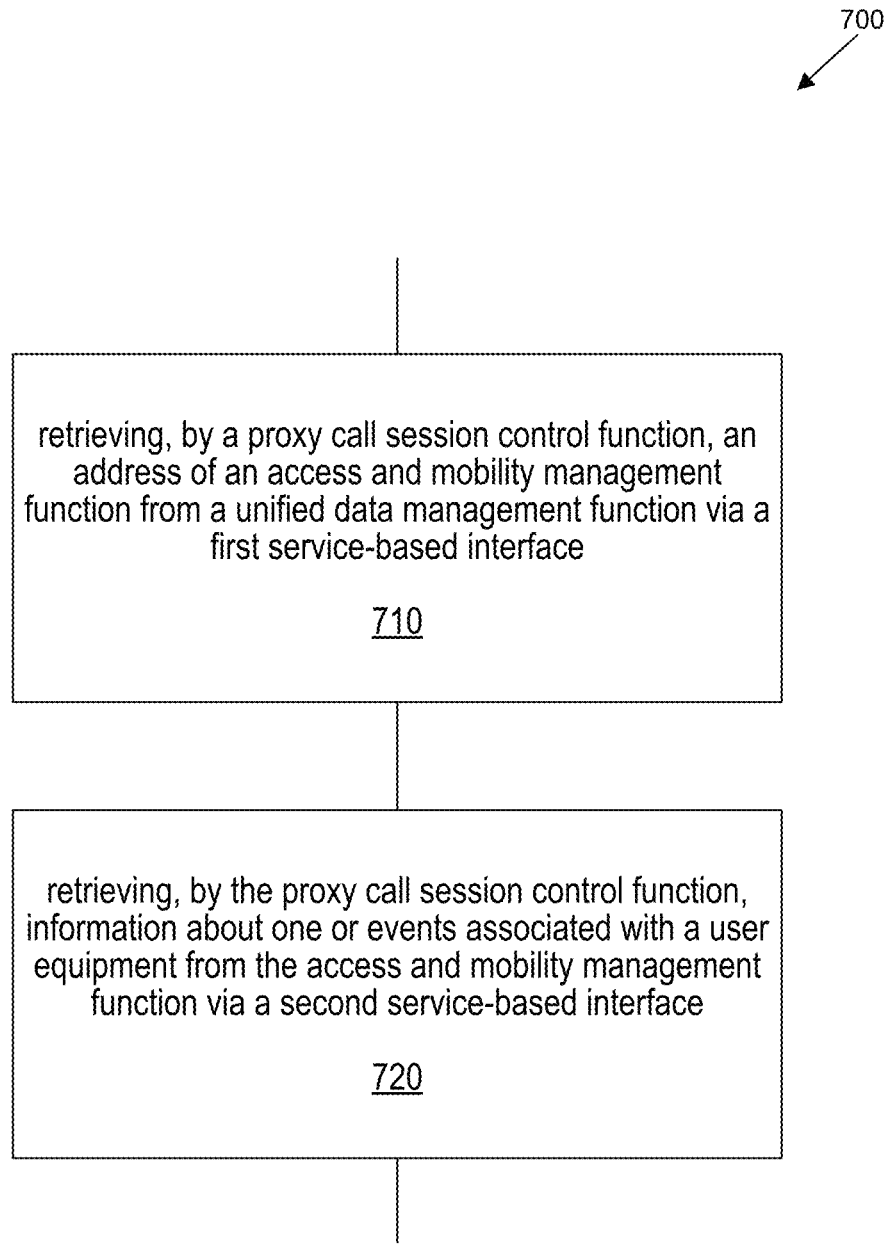
FIG. 7 is a flow chart representation of a method for wireless communication in accordance with one or more embodiments of the present technology.

FIG. 7 is a flowchart representation of a method 700 for wireless communication in accordance with one or more embodiments of the present technology. The method 700 includes, at operation 710, retrieving, by a proxy call session control function, an address of an access and mobility management function from a unified data management function. The proxy call session control function is configured to communicate with the unified data management function directly via a first service-based interface (e.g., Npcscf or Nudm). The method 700 also includes, at operation 720, retrieving, by the proxy call session control function, information about one or more events associated with a terminal device from the access and mobility management function using the address of the access and mobility management function. Examples of events include, but are not limited to, location changes associated with a UE, time-zone changes associated with a UE, and so on. The proxy call session control function is configured to communicate with the access and mobility management function directly via a second service-based interface (e.g., Npcscf or Namf).

In some embodiments, retrieving the information about the one or events associated with the terminal device from the access and mobility management function includes transmitting, by the proxy call session control function, a query to the access and mobility management function requesting information about a specific event, and receiving, by the proxy call session control function in response to the query, information about the specific event. In some embodiments, the method further includes storing the information about the specific event by the proxy call session control function.

In some embodiments, retrieving the information about the one or events associated with the terminal device from the access and mobility management function includes subscribing to the one or more events associated with the terminal device by transmitting a request to the access and mobility management function, and receiving, by the proxy call session control function, a notification from the access and mobility management function. The notification includes the information indicating that one of the one or more events has been triggered.

In some embodiments, the one or more events includes a change of a location or a time zone of the terminal device. In some embodiments, the proxy call session control function is located in a visited Public Land Mobile Network for a user equipment (e.g., as shown in FIG. 6). In some embodiments, the proxy call session control function and the unified data management function are located in a Home Public Land Mobile Network (e.g., as shown in FIG. 5).

Figure 8:
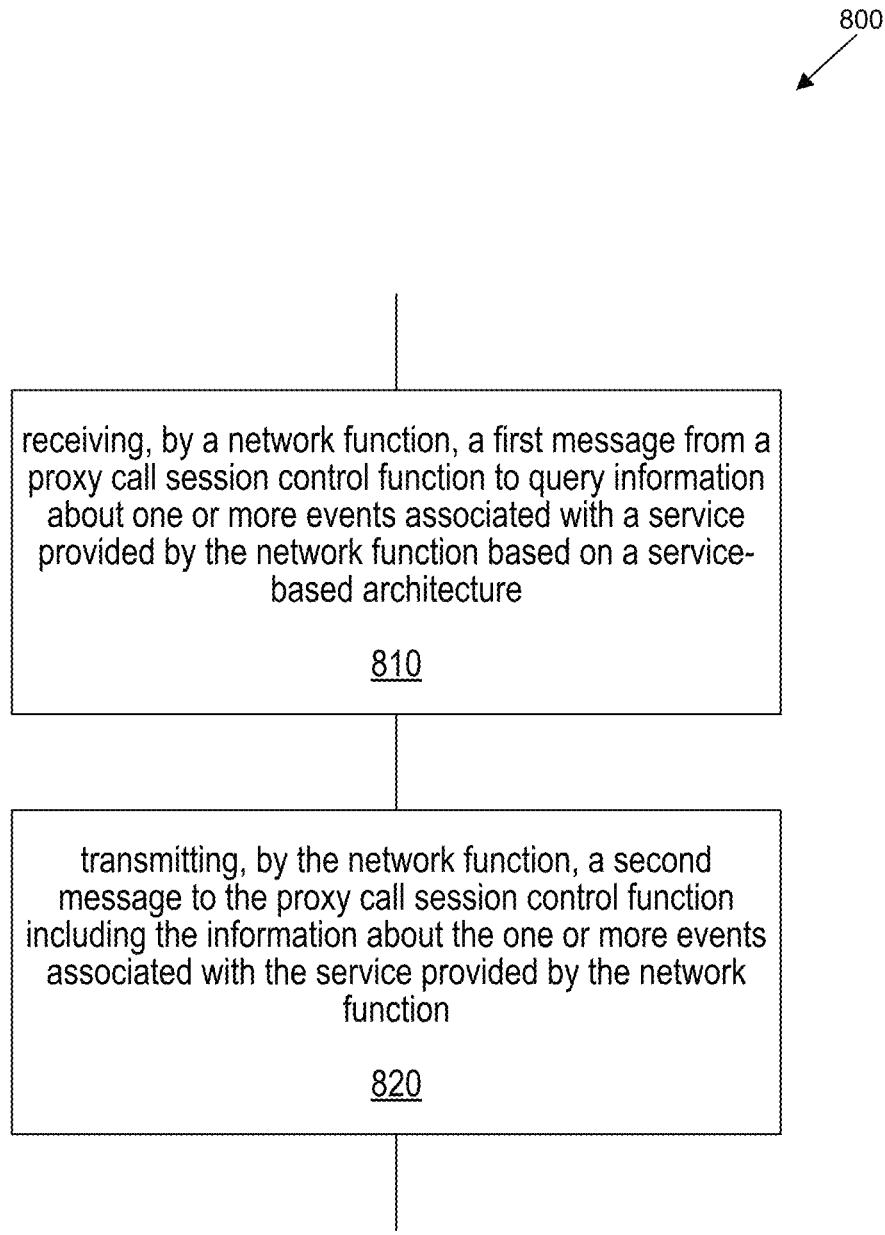
FIG. 8 is a flow chart representation of another method for wireless communication in accordance with one or more embodiments of the present technology.

FIG. 8 is a flowchart representation of a method 800 for wireless communication in accordance with one or more embodiments of the present technology. The method 800 includes, at operation 810, receiving, by a network function (e.g., the AMF), a first message from a proxy call session control function to query information about one or more events associated with a service provided by the network function. The proxy call session control function is configured to communicate directly with the network function based on a service-based architecture (e.g., via a service-based interface Npcscf or Namf). The method 800 includes, at operation 820, transmitting, by the network function, a second message to the proxy call session control function. The second message includes the information about the one or more events associated with the service provided by the network function.

In some embodiments, the method includes receiving, by the network function, a third message from the proxy call session control function to subscribe to the one or more events associated with the service provided by the network function. In some embodiments, the method further includes notifying the proxy call session control function by the network function that at least one of the one or more events has been triggered. In some embodiments, the service provided by the network function comprises a mobility service. In some embodiments, the one or more events comprise a change of a location or a time zone of a terminal device.

In some embodiments, the proxy call session control function and the network function are located in a same Public Land Mobile Network. In some embodiments, the proxy call session control function and the network function are located in different Public Land Mobile Networks.

In another example aspect, a wireless communication system includes a proxy call session control function configured to provide connectivity to an Internet Protocol Multimedia Subsystem to a user equipment and a first network function configured to communicate directly with the proxy call session control function based on a service-based architecture. The proxy call session control function is configured to obtain information about one or more events associated with a service provided by the first network function. For example, the first network function can be the AMF that manages mobility information for the UE.

In some embodiments, the system also includes a second network function configured to communicate directly with the proxy call session control function based on a service-based architecture. The proxy call session control function is configured to obtain information about the first network function from the second network function. For example, the second network function includes a unified data management function that manages serving NF information for the UE.

In some embodiments, the service provided by the first network function comprises a mobility service, and the one or more events comprise a change of a location or a time zone of a terminal device. In some embodiments, the proxy call session control function and the second network function are located in different Public Land Mobile Networks.

In some embodiments the proxy call session control function and the first network function are located in a same Public Land Mobile Network.

It is appreciated that, using the techniques disclosed herein, signaling between the P-CSCF and other network functions for provide IMS services no longer needs to be routed along a long path using multiple interfaces. Direct communication between the P-CSCF and NFs is enabled by the unified service-based interfaces, thereby reducing signaling overhead and delay, particularly in roaming scenarios.

Computer System

Figure 9:
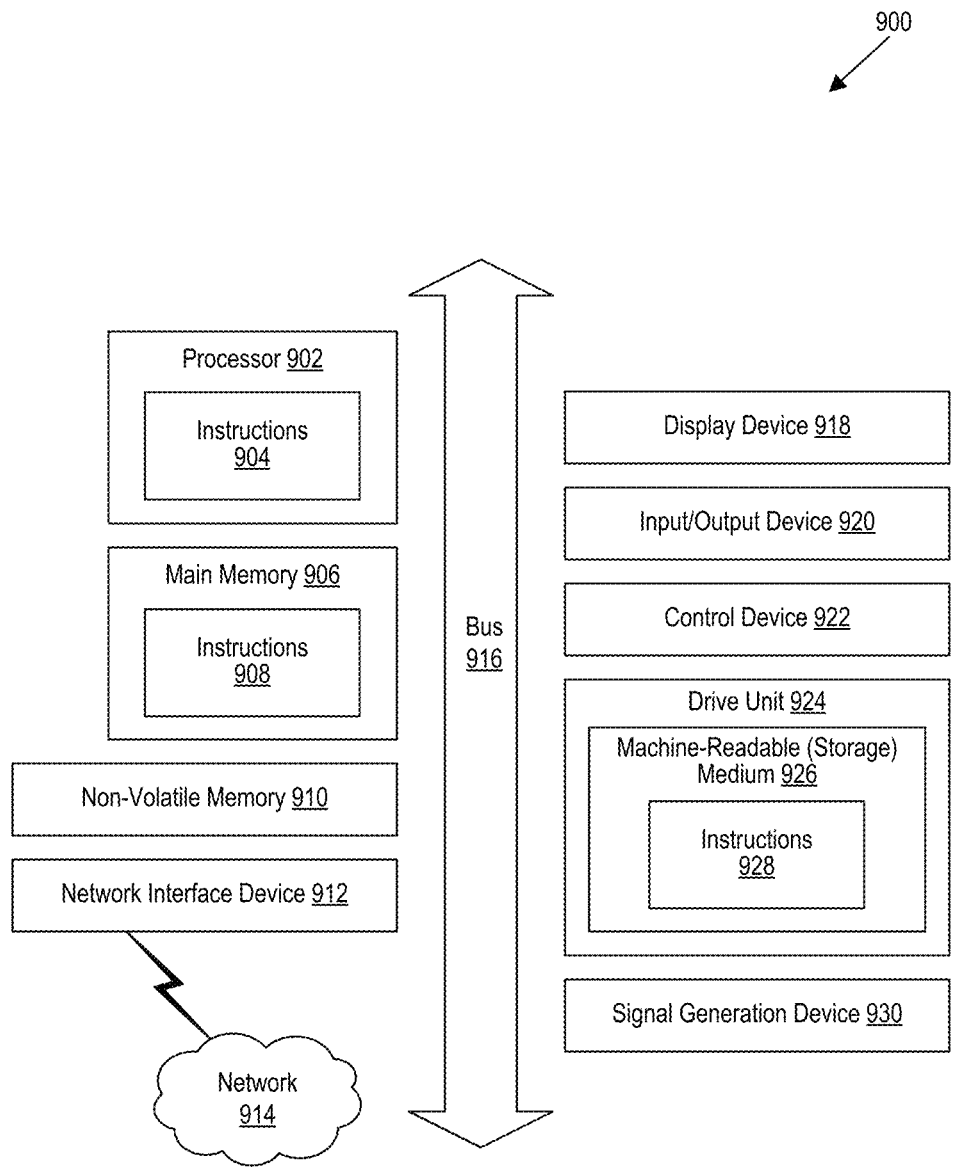
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable medium, excluding transitory signals, and carrying instructions, which when executed by a server in a wireless telecommunications network, implements a process comprising:
   retrieving, by a proxy call session control function (P-CSCF), an address of an access and mobility management function (AMF) from a unified data management function (UDF),
      wherein the proxy call session control function is configured to communicate with the unified data management function directly via a first service-based interface; and
   retrieving, by the proxy call session control function, information about one or more events associated with a terminal device from the access and mobility management function using the address of the access and mobility management function,
      wherein the proxy call session control function is configured to communicate with the access and mobility management function directly via a second service-based interface, and
      wherein the second service-based interface differs from the first service-based interface.

2. The computer-readable medium of claim 1, wherein retrieving the information about the one or events associated with the terminal device from the access and mobility management function comprises:
   transmitting, by the proxy call session control function, a query to the access and mobility management function requesting information about a specific event; and
   receiving, by the proxy call session control function in response to the query, the information about the specific event.

3. The computer-readable medium of claim 2, further comprising:
   storing the information about the specific event by the proxy call session control function.

4. The computer-readable medium of claim 1, wherein retrieving the information about the one or events associated with the terminal device from the access and mobility management function comprises:
   subscribing to the one or more events associated with the terminal device by transmitting a request to the access and mobility management function; and
   receiving, by the proxy call session control function, a notification from the access and mobility management function, wherein the notification includes the information indicating that one of the one or more events has been triggered.

5. The computer-readable medium of claim 1, wherein the one or more events comprise a change of a location or a time zone of the terminal device.

6. The computer-readable medium of claim 1, wherein the proxy call session control function is located in a visited Public Land Mobile Network for a user equipment.

7. The computer-readable medium of claim 1, wherein the proxy call session control function and the unified data management function are located in a Home Public Land Mobile Network.

8. A method for wireless communication, comprising:
receiving, by an access and mobility management function (AMF), a first message from a proxy call session control function (P-CSCF) directly via a first service-based interface to query information about one or more events associated with a service provided by the AMF,
wherein the P-CSCF is configured to obtain an address of the AMF for transmitting the first message by communicating directly with a unified data management function (UDF) via a second service-based interface; and
transmitting, by the network function, a second message to the P-CSCF,
wherein the second message including the information about the one or more events associated with the service provided by the network function.

9. The method of claim 8, further comprising:
receiving, by the AMF, a third message from the P-CSCF to subscribe to the one or more events associated with the service provided by the AMF.

10. The method of claim 8, further comprising:
notifying the P-CSCF by the AMF that at least one of the one or more events has been triggered.

11. The method of claim 8, wherein the one or more events comprise a change of a location or a time zone of a terminal device.

12. The method of claim 8, wherein the P-CSCF and the AMF are located in a same Public Land Mobile Network.

13. The method of claim 8, wherein the P-CSCF and the AMF are located in different Public Land Mobile Networks.

14. A wireless communication system, comprising:
a proxy call session control function configured to provide connectivity to an Internet Protocol Multimedia Subsystem to a user equipment;
a first network function configured to communicate directly with the proxy call session control function based on a service-based architecture,
wherein the proxy call session control function is configured to obtain information about one or more events associated with a service provided by the first network function;
a second network function configured to communicate directly with the proxy call session control function based on the service-based architecture,
wherein the proxy call session control function is configured to obtain information about the first network function from the second network function.

15. The wireless communication system of claim 14, wherein the second network function comprises a unified data management function.

16. The wireless communication system of claim 14, wherein the proxy call session control function and the second network function are located in different Public Land Mobile Networks.

17. The wireless communication system of claim 14, wherein the proxy call session control function and the first network function are located in a same Public Land Mobile Network.

18. The wireless communication system of claim 14, wherein the service provided by the first network function comprises a mobility service, and wherein the one or more events comprise a change of a location or a time zone of a terminal device.

19. The wireless communication system of claim 14, wherein the proxy call session control function is configured to:
transmit a query to the first network function requesting information about a specific event; and
receiving, in response to the query, the information about the specific event.

20. The wireless communication system of claim 14, wherein the proxy call session control function is configured to:
subscribe to the one or more events associated with the terminal device by transmitting a request to the first network function; and
receive a notification from the first network function, wherein the notification includes the information indicating that one of the one or more events has been triggered.

* * * * *